United States Patent [19]
Felix

[11] 3,872,642
[45] Mar. 25, 1975

[54] ASSEMBLING DEVICE FOR TWO TUBULAR PROFILES

[76] Inventor: André Felix, 1030 Bussigny, Vaud, Switzerland

[22] Filed: Apr. 2, 1974

[21] Appl. No.: 457,263

[30] Foreign Application Priority Data
Apr. 3, 1973 Switzerland............ 4763/73

[52] U.S. Cl.............. 52/758 C, 52/584, 52/586
[51] Int. Cl............................................. E04b 1/40
[58] Field of Search ............ 52/582, 584, 586, 498, 52/499, 698, 753 C, 758 C, 585

[56] References Cited
UNITED STATES PATENTS

| | | | |
|---|---|---|---|
| 2,661,083 | 12/1953 | Henderson................ | 52/758 C |
| 2,696,139 | 12/1954 | Attwood................... | 52/758 C |
| 3,229,335 | 1/1966 | Thome..................... | 52/584 X |
| 3,296,764 | 1/1967 | Tremblay.................. | 52/584 |
| 3,430,997 | 3/1969 | Propst et al............... | 52/584 X |
| 3,537,736 | 11/1970 | Kroopp.................... | 52/584 X |
| 3,641,728 | 2/1972 | Hallauer................... | 52/498 |

Primary Examiner—Price C. Faw, Jr.
Attorney, Agent, or Firm—Stevens, Davis, Miller & Mosher

[57] ABSTRACT

An assembling device for two tubular profiles provided with a longitudinal slot on at least one side; two prismatic elements are provided, each intended for insertion into one of the two profiles to be assembled, blocking means for these two elements in the profiles, a rod rigidly fixed with one of the said elements engaging into a bore of the other element by traversing the longitudinal slots of the two profiles to be assembled and locking means for the rod in said other element are also present.

2 Claims, 2 Drawing Figures

PATENTED MAR 25 1975

3,872,642

ASSEMBLING DEVICE FOR TWO TUBULAR PROFILES

The present invention relates to an assembling device for two tubular profiles having a longitudinal slot on at least one side.

The object of the present invention is to provide a particularly simple and rapid solution for assembling such tubular profiles, which are especially used for the construction of shop windows, furnishings, shop and exposition stand arrangements or even fittings for walls and other surfaces, partition walls or separation screens.

The assembling device according to the invention is characterized in that it comprises two prismatic elements each intended for insertion into one of the two profiles to be assembled, blocking means for these two elements in the profiles, a rod rigidly fixed with one of said elements engaging into a bore of the other element by traversing the longitudinal slots of the two profiles to be assembled and locking means for the rod in said other element.

The annexed drawing represents, as an example, an embodiment of the assembly according to the invention.

Figures 1, 2:
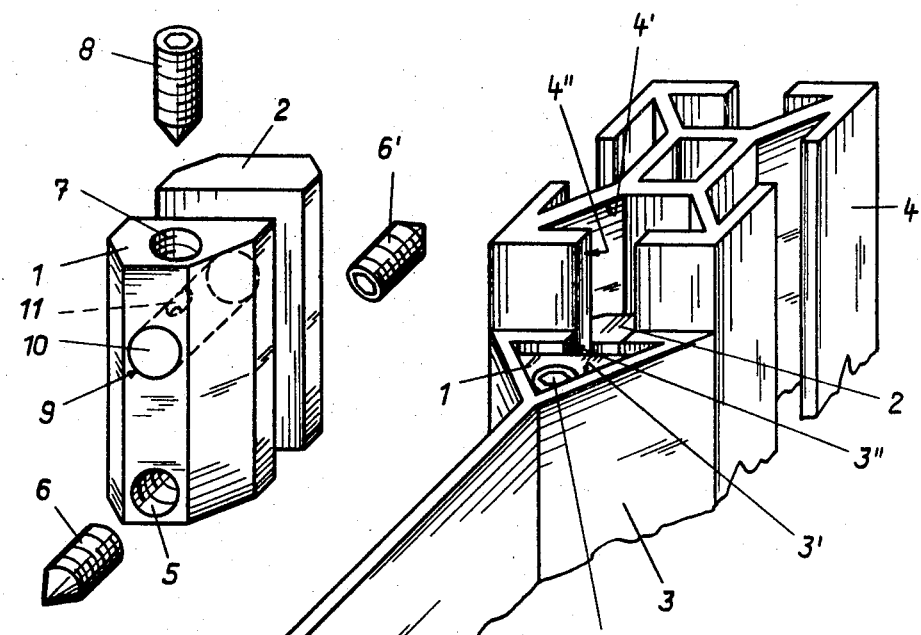
FIG. 1 is an exploded view in perspective of the separate elements of the device.
FIG. 2 is a perspective view on a smaller scale showing the device used in the case of the assembly of two profiles.

The device shown in FIG. 1 includes two prismatic elements 1 and 2 each intended for insertion in a tubular profile. Element 1 has a five-sided section corresponding to a half-octagon, the other half-octagon of which is formed by the section of element 2. This section fits equally well into the triangular internal section 3' of the profile 3 or into the trapezoidal internal section 4' of the profile 4.

In order to fix element 1 into profile 3, a threaded hole 5 is provided at one end of element 1 into which the counter-sunk screw 6 is screwed from the exterior of profile 3 through the longitudinal slot 3'' thereof. At the end of element 1 a threaded hole 7 is bored to receive a conical counter-sunk screw 8 the object of which will be described later. This hole 7 opens perpendicularly into a bore 9 parallel to the threaded hole 5.

A threaded bore (not shown) is also drilled in prismatic element 2 to receive a counter-sunk locking screw 6' the purpose of which is to lock element 2 in the recess 4' of profile 4. A rod 10 rigidly fixed to element 2 traverses the longitudinal slots 4'' and 3'' of the respective profiles so as to penetrate into the bore 9 of element 1. The rod 10 is provided with a conical recessed hole 11 into which the conical extremity of the locking screw 8 penetrates when the latter is screwed into the hole 7 perpendicular to the bore 9. This screw 8 is accessible from the exterior of profile 3 and by cooperating with the hole 7 causes the joining of the two profiles upon tightening.

In order to separate profiles 3 and 4 assembled as shown in FIG. 2, all that is required is to unscrew the locking screw 8. The rod 10 is then freed and can be extracted from bore 9 by separating profile 3 from profile 4, for example.

Instead of providing prismatic elements having sections in the shape of half-octagons, it would of course be possible to envisage other shapes, polygonal or otherwise.

I claim:

1. Assembling device for two tubular profiles provided with a longitudinal slot on at least one side, characterized in that it comprises two prismatic elements each intended for insertion into one of the two profiles to be assembled, blocking means for these two elements in the profiles, a rod rigidly fixed with one of said elements engaging into a bore of the other element by traversing the longitudinal slots of the two profiles to be assembled and locking means for the rod in said other element.

2. Device according to claim 1, characterized in that each prismatic element has a polygonal section corresponding to the section of the profile into which it is inserted, in that each element is bored at one extremity by a threaded hole intended to receive a counter-sunk locking screw accessible through the longitudinal slot of the respective profile, said screw being locked against the interior wall of the profile and in that a counter-sunk locking screw is screwed into a hole perpendicular to the bore receiving said rod, this conical locking screw being disposed endwise in the prismatic element in order to be accessible from the exterior, this screw cooperating with a recessed conical hole in order to cause the joining of the two profiles upon tightening.

* * * * *